United States Patent [19]

Matsuo et al.

[11] Patent Number: 4,822,067
[45] Date of Patent: Apr. 18, 1989

[54] FRONT FENDER FOR VEHICLE

[75] Inventors: Yoshihiro Matsuo, Tokorozawa; Yukihiro Yamazaki, Asaka, both of Japan

[73] Assignee: Honda Giken Kogyo Kabushiki Kaisha, Tokyo, Japan

[21] Appl. No.: 873,869

[22] Filed: Jun. 12, 1986

Related U.S. Application Data

[63] Continuation of Ser. No. 688,121, Dec. 31, 1984, abandoned.

[30] Foreign Application Priority Data

Dec. 29, 1983 [JP] Japan ............... 58-203234

[51] Int. Cl.⁴ ............... B60K 11/06
[52] U.S. Cl. ............... 280/152.1; 180/229; 180/68.1; 180/903; 296/180.1
[58] Field of Search ............... 280/152.1, 152.2, 152.3, 280/154.5 A; 180/229, 219, 68.1, 68.3; D12/186; 296/15, 180.1

[56] References Cited

U.S. PATENT DOCUMENTS

| | | | |
|---|---|---|---|
| 4,458,909 | 7/1984 | Monoka | 180/219 |
| 4,564,081 | 1/1986 | Hamane et al. | 180/68.1 |

FOREIGN PATENT DOCUMENTS

| | | | |
|---|---|---|---|
| 21657 | 7/1981 | European Pat. Off. | 180/68.1 |
| 477708 | 2/1953 | Italy | 180/229 |
| 44531 | 3/1982 | Japan | 180/219 |
| 10498 | 5/1908 | United Kingdom | 180/229 |

Primary Examiner—Charles A. Marmor
Assistant Examiner—Karin Tyson
Attorney, Agent, or Firm—Armstrong, Nikaido, Marmelstein & Kubovcik

[57] ABSTRACT

Guide walls are extended upwardly along the side edges of a front fender mounted between a pair of front forks of a two-wheeled or three-wheeled vehicle. These guide walls streamline the air flowing along the front fender and cause the volume of air flowing toward an engine installation position to be increased. Disturbance of air due to the front forks can be reduced to a minimum by these guide walls and outer plates which are branched from the guide walls so as to cover the outer portions of the front forks so that the air resistance can be decreased. The guide walls reinforce the front fender and give them rigidity sufficient to prevent vibration of the front fender when the two-wheeled or three-wheeled vehicle is running.

9 Claims, 7 Drawing Sheets

FRONT FENDER FOR VEHICLE

This application is a continuation of application Ser. No. 688,121, filed Dec. 31, 1984, now abandoned.

BACKGROUND OF THE INVENTION

The present invention relates to a front fender for a two-wheeled or three-wheeled vehicle in which a front wheel is supported by a pair of right and left front forks.

In a two-wheeled vehicle or the like, a front fender is mounted above a front wheel so as to cover the same in order to keep water, mud, dirt, etc. from being thrown upwards. The front fender is sandwiched between right and left front forks and comprises an arcuately curved upper surface which is extended longitudinally along the outer peripheral portion of the front wheel and downwardly extended side edge portions covering the right and left sides of the front wheel. Therefore the front fender has an inverted-U-shaped cross sectional configuration. The side edge portions are integrally joined to the upper surface by means of rounded portions so that the air which flows from the front of the two-wheeled vehicle or the like not only passes along the upper surface but also flows obliquely downwardly along the rounded portions. Furthermore the air flow is disturbed by the front forks. As a result, the air flow lines along the front fender are considerably complicated so that the air resistance is increased. Moreover, the volume of air flowing backwardly through the space between the front forks toward a place where an engine is installed, is decreased. As a result, the volume of air cooling the engine is decreased. Furthermore it has been necessary for the conventional front fenders that the thickness of a front fender is increased so that vibration of the front end portion of the fender due to the high-speed air flows when the two-wheeled vehicle or the like is running must be prevented. That is, the rigidity of a front fender must be increased.

SUMMARY OF THE INVENTION

In view of the above, a first object of the present invention is to provide a front fender which streamlines the flowing air so that the air resistance can be decreased.

A second object of the present invention is to provide a front fender which can permit the flow of air in large quantities through the space between the front forks toward a backward place where an engine is installed.

A third object of the present invention is to provide a front fender which is reinforced by the provision of a substantially U-shaped cross section so as to provide a high degree of rigidity against vibration so that the front fender can be made thin in thickness and light in weight.

A fourth object of the present invention is to provide a front fender in which there are provided outer plates covering the outer portions of the front forks so that the air flows can be prevented from being disturbed by the front forks.

A fifth object of the present invention is to provide a front fender which can be mounted in front of a cowling covering an engine and other heat sources so that the cooling air is forced into the cowling.

To the above and other ends, according to the present invention, guide walls are extended upwardly along the side edges of a front fender.

According to the present invention, the air flows through an air flow passage substantially U-shaped in cross section defined by the upper surface and guide walls of the front fender. Therefore the air flow is not disturbed so that the air resistance is reduced to a minimum Furthermore, the air is directed through the air passage to a place where an engine is installed so that the air in large quantities can be supplied to heat sources such as an engine and the like. Moreover, the front fender is reinforced by the guide walls so that it has a high degree of rigidity. Therefore even when the thickness of the front fender is reduced, vibration can be minimized. Therefore the present invention can provide a front fender which is light in weight. According to a further aspect of the present invention, the outer portions of the front forks are covered with outer plates so that disturbance of air due to the front forks can be decreased and consequently the air resistance can be reduced.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

Figure 1A:
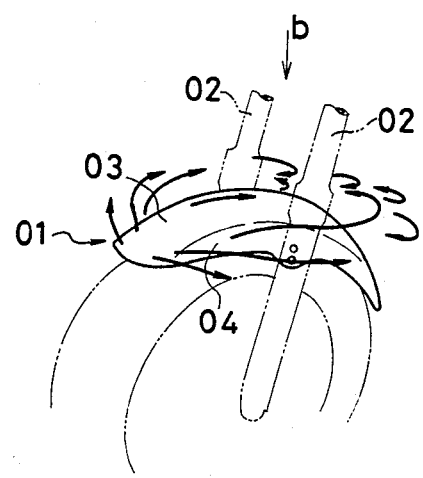
FIG. 1A being a perspective view while FIG. 1B being a top view.
Figure 1B:
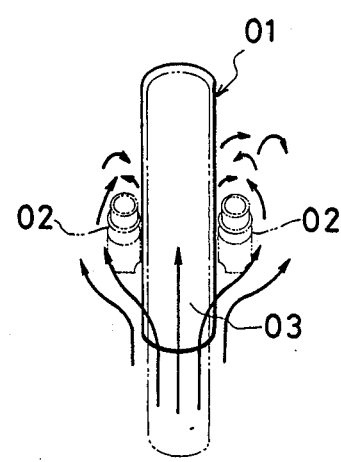
FIG. 1 shows a conventional front fender and air flows.

FIG. 1 shows a conventional front fender 01. The front fender 01 is sandwiched between right and left front forks 02 and has an arcuated upper surface 03 extended along a wheel and side edge portions 04 which are extended downwardly for covering the right and left sides of the wheel. The side edge portions 04 are connected through rounded portions with the top surface 03 so that when a two-wheeled vehicle is running, the air which flows from the front of the two-wheeled vehicle not only passes along the upper surface 03 but also flows obliquely downwardly along the rounded portions. Furthermore because of the front forks 02, the air flow is disturbed as if a cylinder were placed in a uniform flow of a fluid as indicated by arrows in FIGS. 1A and B. The flow lines are considerably complex. FIG. 1B is a top view looking in the direction indicated by an arrow b in FIG. 1A.

Figure 2:
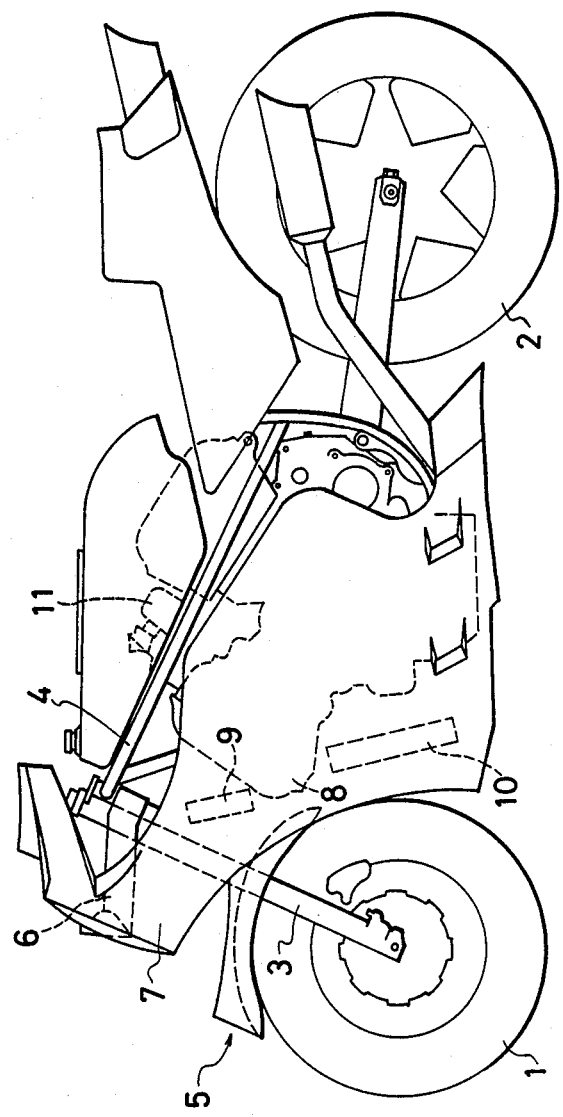
FIG. 2 is a side view of a two-wheeled vehicle with a front fender in accordance with the present invention.

FIG. 2 is a side view of a two-wheeled vehicle with a front fender of the present invention. Reference numeral 1 designates a front wheel and 2, a rear wheel. The front wheel 1 is supported by a pair of right and left front forks 3 which in turn are pivotably fastened to a frame 4. A front fender 5 is attached to the front forks 3 above the front wheel 1. A fairing stay 6 is extended forwardly from the front of the frame 4 and a fairing 7 is attached to the front portion of the fairing stay 6. The fairing 7 not only covers the upper front of a vehicle body but also extends backwardly along the sides of the vehicle body so as to cover them. An engine 8 and its associated parts are mounted on the frame 4 in the space defined by the fairing 7. Reference numeral 9 denotes an oil cooler and 10, a radiator. The oil cooler 9 and the radiator 10 are cooled by the air flowing into the fairing from the front of the two-wheeled vehicle. Reference numeral 11 denotes a carburetor.

Figure 3:
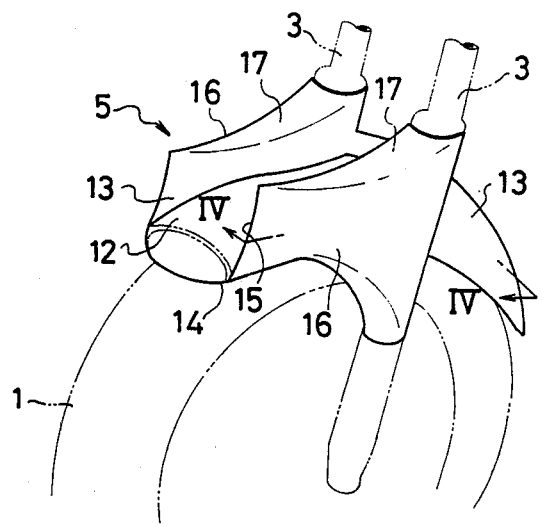
FIG. 3 is a perspective view of a first embodiment of a front fender in accordance with the present invention.
Figure 4:
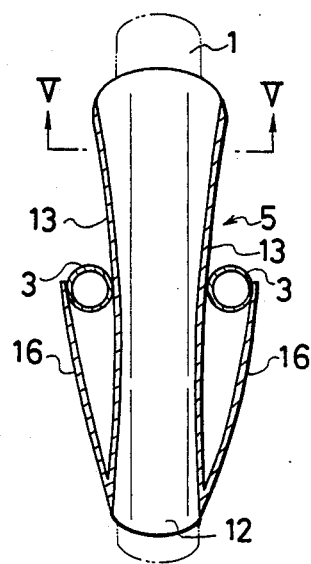
FIG. 4 is a sectional view taken along the line IV—IV of FIG. 3.
Figure 5:
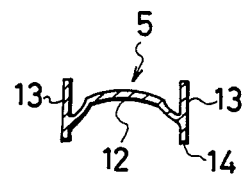
FIG. 5 is a sectional view taken along the line V—V of FIG. 4.

FIGS. 3–5 show the detailed construction of the front fender 5. As is clear from these figures and especially from FIG. 5, the front fender 5 comprises a fender main body 12 which is similar to the outer configuration of the front wheel and is curved forwardly, backwardly and laterally and guide walls 13 extended upwardly from the side edges of the main body 12. Side edge portions 14 are extended downwardly from the guide walls 13 as in the case of a conventional front fender. Therefore the front fender 5 has an H-shaped cross sectional configuration. That is, the front fender 5 has a U-shaped cross section defined by the main body 12 and the guide walls 13. The width between the guide walls 13 is reduced between the front forks 3 and is enlarged in front of and behind the front forks 3.

As shown in FIGS. 3 and 4, the front fender 5 is mounted on the front forks 3 in such a way that the guide walls 13 are located inwardly of the front forks 3, and other plates; that is, the outer plates 16 are branched from the front portions of the guide walls 13 and are extended backwardly to the outer side portions of the front forks 3. Therefore the front forks 3 are clamped between the guide walls 13 and the outer plates 16. The spaces between the upper and lower side edges of the guide walls 13 and the outer plates 16 are covered with connecting portions 17.

The front fender 5 in accordance with the present invention has a substantially U-shaped cross section so that it has a high degree of rigidity. As a result, even when the thickness of the front fender 5 is made thinner than the thickness of a conventional front fender, the front portion is prevented from vibrating due to the air flows. Therefore, the thickness of the front fender 5 can be reduced so that the front fender 5 can be made light in weight.

Figure 6A:
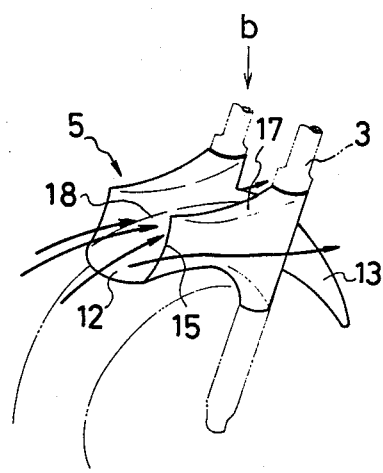
FIGS. 6A and B are perspective and top views, respectively, illustrating the air flow in the vicinity of the front fender.
Figure 6B:
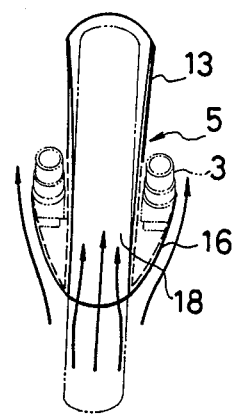

The front fender 5 in accordance with the present invention has the guide walls 13 extended upwardly along the side edges of the front fender 5 so that the disturbance of air flows by the front forks can be prevented. FIG. 6 shows the air flows in the vicinity of and along the front fender 5 when the two-wheeled vehicle is running. FIG. 6A is a perspective view and FIG. 6B is a top view. Air flows are indicated by arrows. As shown, the guide walls 13 of the front fender 5 are located inwardly of the front forks 3 and are extended upwardly along the side edges of the upper surface of the fender main body 12 so that the upper portion of the front fender 5 defines a U-shaped smooth air passage 18. As a result, the air which flows along the upper surface of the front fender 5 from the front of the two-wheeled vehicle is streamlined by the smooth inner surfaces of the air flow passage 18 and flows backwardly in the air flow passage 18 without causing the disturbance of flow lines. There is no air flow which flows obliquely downwardly along the downwardly extended side edge portions as described with reference to FIG. 1. As a consequence, the volume of air flowing backwardly past the front forks is increased. The air flows into the fairing 7 and is used to cool equipment or the like which must be cooled; that is, to cool the engine 8, the oil cooled 9 and the radiator 10 mounted within the fairing 7. As the volume of air flow is increased as described above, the cooling efficiency can be improved.

Furthermore, the air which flows along the upper surface of the front fender 5 is not influenced by the front forks 3 so that the air resistance is decreased.

The air flows which flow the lateral sides of the front fender 5 are guided and streamlined by the outer plates 16. That is, the air flows outwardly of the front forks 3 as continuous smooth flow lines. There is no stagnant air in front of the front forks as described above with reference to FIG. 1 and no vortex is formed behind the front forks 3. As a consequence, the air resistance can be considerably decreased. The upper and lower side edges of the outer plates 16 and the guide walls 13 are connected by the connecting portions 17 as described above so that the air flows smoothly along the connecting portions 17.

Figure 7:
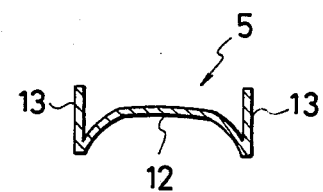
FIG. 7 is a view similar to FIG. 5 but illustrates a second embodiment of the present invention.

As shown in FIG. 7, the front fender 5 may have an inverted-M-shaped cross section. That is, in the first embodiment described with reference to FIG. 5, the guide walls 13 are extended downwardly from the main body 12 so as to define the side edge portions 14 so that the first embodiment has a H-shaped cross sectional configuration, but in the second embodiment shown in FIG. 7, the lower portions of the guide walls 13 are not extended downwardly. As compared with the conventional front fenders, the second embodiment as shown in FIG. 7 also has by far a high degree of rigidity.

Figure 8:
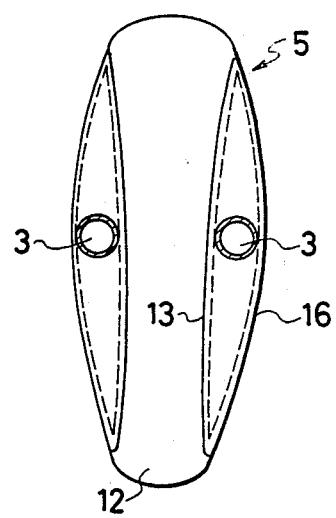
FIG. 8 is a top view illustrating a third embodiment of the present invention.

As shown in FIG. 8, according to the present invention, the outer plates 16 may be extended backwardly beyond the front forks 3 and the rear ends of the outer plates 16 may be joined to the rear portions of the guide walls 13. Therefore the front forks 3 may be surrounded with streamlined structures each consisting of the outer plate 16 and the guide wall 13. Therefore the disturbance of air flowing around the front forks 3 can be further decreased so that the air resistance is also decreased. Furthermore, the cooling efficiency of the engine, the oil cooler and the radiator can be increased. It is also possible that the outer plates 16 are disposed only at the rear portion of the front fender 5.

Figure 9:
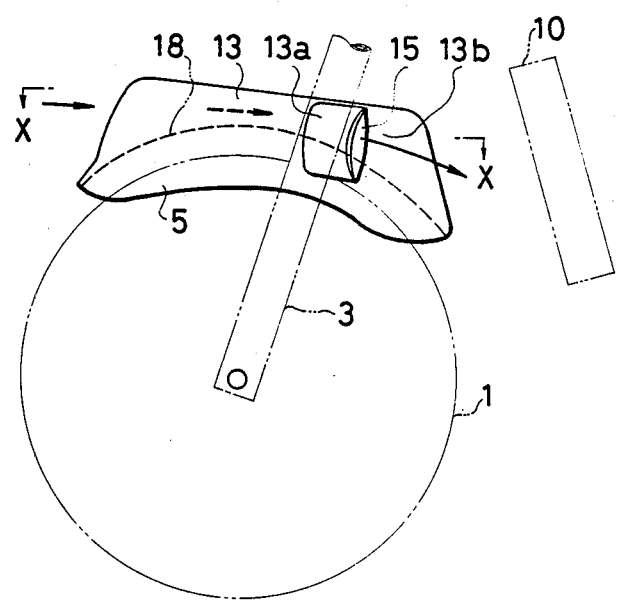
FIG. 9 is a side view illustrating a forth embodiment of the present invention.
Figure 10:
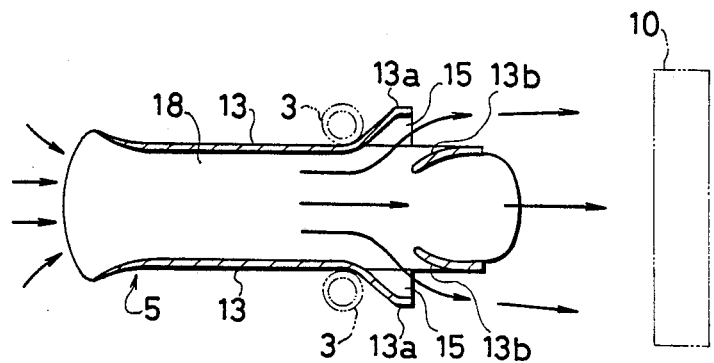
FIG. 10 is a sectional view taken along the line X—X of FIG. 9.

FIGS. 9 and 10 show a fourth embodiment of the present invention. In the fourth embodiment, each wall guide 13 is partially cut out behind the front fork 3 and is extended outwardly so as to define a discharge port 15. The portion 13b of the guide wall behind the outwardly extended portion 13a thereof is bent inwardly as best shown in FIG. 10. Therefore, part of the air flowing along the air flow passage 18 is guided by the outwardly extended portion 13a and the inwardly bent portion 13b and discharged through the discharge port 15 obliquely laterally. The air flow along the outside portion of the front fender and cools the radiator 10.

Figure 11:
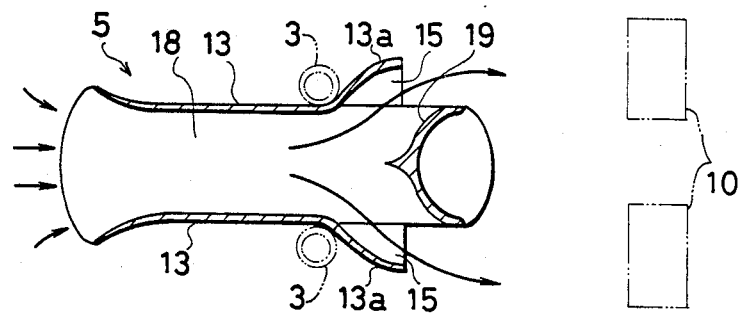
FIG. 11 is a view similar to FIG. 10 but illustrates a fifth embodiment of the present invention.

In a fifth embodiment shown in FIG. 11, the inwardly bent portions (See FIG. 10) 13b are joined to each other to define a partition wall 19 so that the air is prevented from flowing backwardly along the axis of the air flow passage 18.

The fifth embodiment is particularly adapted to the case when two radiators 10 are mounted and spaced apart from each other in the lateral direction by a suitable distance.

So far the preferred embodiments of the present invention has been described, but it is to be understood that the present invention is not limited thereto and that various modifications and changes can be effected within the spirit and scope of the present invention as recited in the following claims.

What is claimed is:

1. A front fender mounted between a pair of right and left front forks for a vehicle having a frame, a front wheel, at least one rear wheel, and an engine mounted therebetween, comprising:
   a fender main body mounted above a front wheel and directly supported by left and right front forks, said fender main body having an arcuately curved upper surface extending longitudinally along an outer peripheral portion of said front wheel, said fender main body being curved longitudinally forwardly and rearwardly and also laterally to respective lateral edges thereof;
   a pair of guide walls projecting upwardly from each of said respective lateral edges of said upper surface of said fender main body and longitudinally therealong, said fender main body and said guide walls defining a channel having a substantially U-shaped transverse cross-section, being open along the top portion thereof; and
   a pair of said edge portions each projecting downwardly from a respective one of said guide walls and longitudinally therealong, such that said front fender, guide walls and side edge portions define a substantially H-shaped configuration in transverse cross-section.

2. A front fender as set forth in claim 1, wherein the distance between said guide walls is reduced between said front forks and is progressively increased forwardly of said front forks.

3. A front fender as set forth in claim 1, wherein the distance between said guide walls is reduced between said front forks and is increased rearwardly of said forks.

4. A front fender as set forth in claim 1, wherein the distance between said guide walls is reduced between said front forks and increased forwardly and rearwardly thereof.

5. A front fender as set forth in claim 1, wherein a front end portion of said front fender comprised of a front portion of said fender main body and front portions of said guide walls defines an inverted U-shaped lateral cross sectional configuration open upwardly and said guide walls are extended rearwardly at least to the vicinity of said front forks.

6. A front fender as set forth in claim 1, further comprising a pair of outer plates each joined at a forward end thereof to a forward end portion of a respective, one of said guide walls, said outer plates each branching outwardly from said juncture with said respective guide wall and extending rearwardly in the form of a wedge therewith, and a pair of cover plates connecting the top of each of said guide walls with its respective outer plate so as to cover an outer portion of a respective one of said front forks.

7. A front fender as set forth in claim 1 or 6, further comprising a pair of outer plates each joined at a rearward end thereof to a rearward end portion of a respective one of said guide walls, said outer plates each branching outwardly from said juncture with said respective guide wall and extending forwardly in the form of a wedge therewith, and a pair of cover plates connecting the top of each of said guide walls with its respective outer plate so as to cover an outer portion of a respective one of said front forks.

8. A front fender as set forth in claim 1, wherein said vehicle is provided with a cowling for covering at least a front portion of said frame above said front fender and for covering a central portion of said frame behind said front wheel and for surrounding said engine and other heat sources, said front fender projecting in front of said cowling.

9. A front fender mounted between a pair of right and left front forks of a vehicle having a frame, a front wheel and at least one rear wheel, and an engine mounted therebetween, comprising:
   a fender main body mounted above a front wheel and directly supported by left and right front forks, said fender main body having an arcuately curved upper surface extending longitudinally along an outer peripheral portion of said front wheel, said fender main body being curved longitudinally forwardly and rearwardly and also laterally to respective lateral edges thereof; and
   a pair of guide walls extended upwardly from each of said respective lateral edges of said upper surface of said fender main body and longitudinally therealong, said fender main body and said guide walls defining a channel having an inverted-M-shaped transverse cross-section, being open along the top portion thereof.

* * * * *